No. 669,924. Patented Mar. 12, 1901.
C. R. GREUTER.
DRIVING AND REVERSING GEAR.
(Application filed Feb. 15, 1900.)
(No Model.) 3 Sheets—Sheet 1.
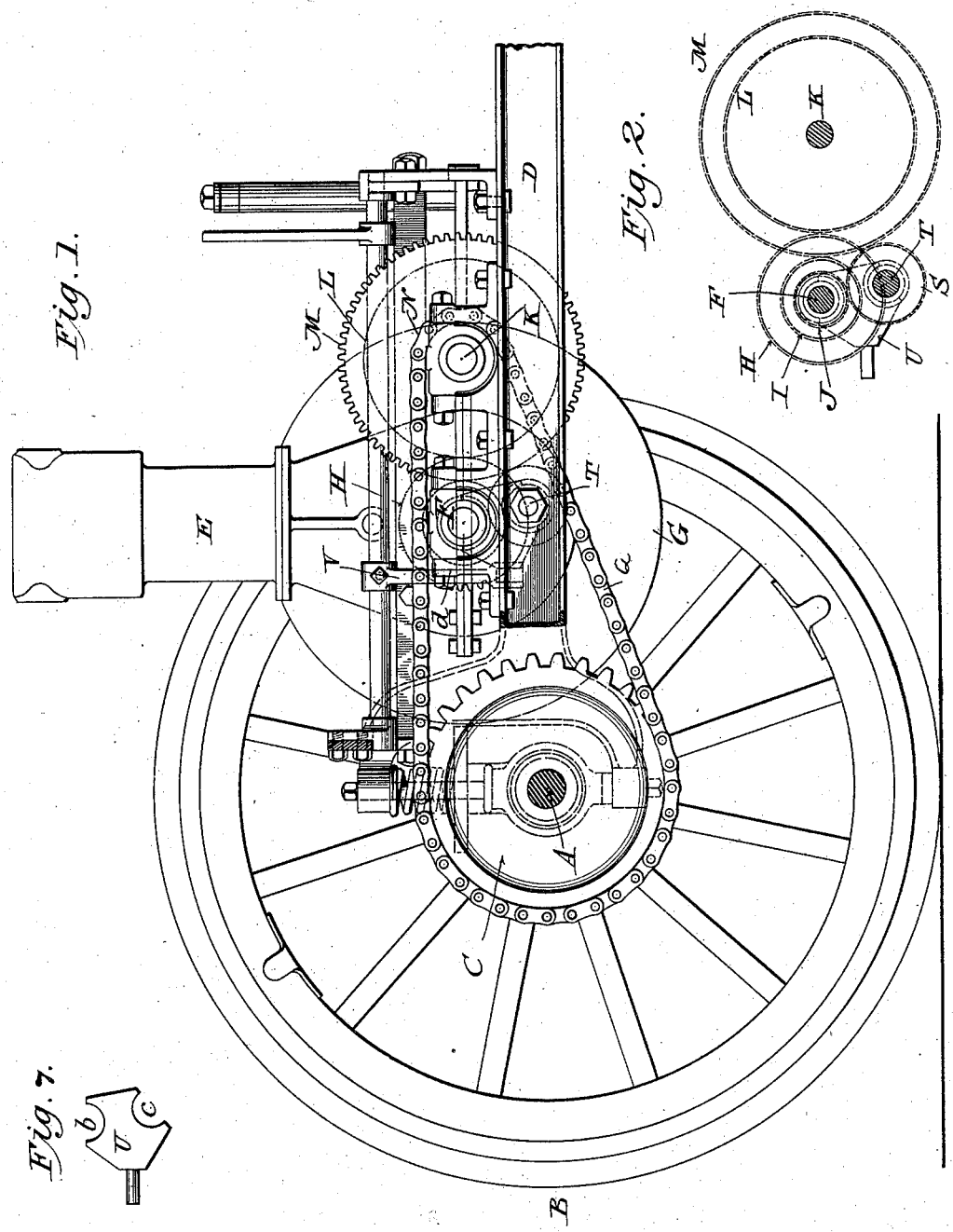
Witnesses
J. B. Malnate
[signature]
Inventor:
Charles R. Greuter,
by Dodge and Sons
Attorneys No. 669,924. Patented Mar. 12, 1901.
C. R. GREUTER.
DRIVING AND REVERSING GEAR.
(Application filed Feb. 15, 1900.)
(No Model.) 3 Sheets—Sheet 2.
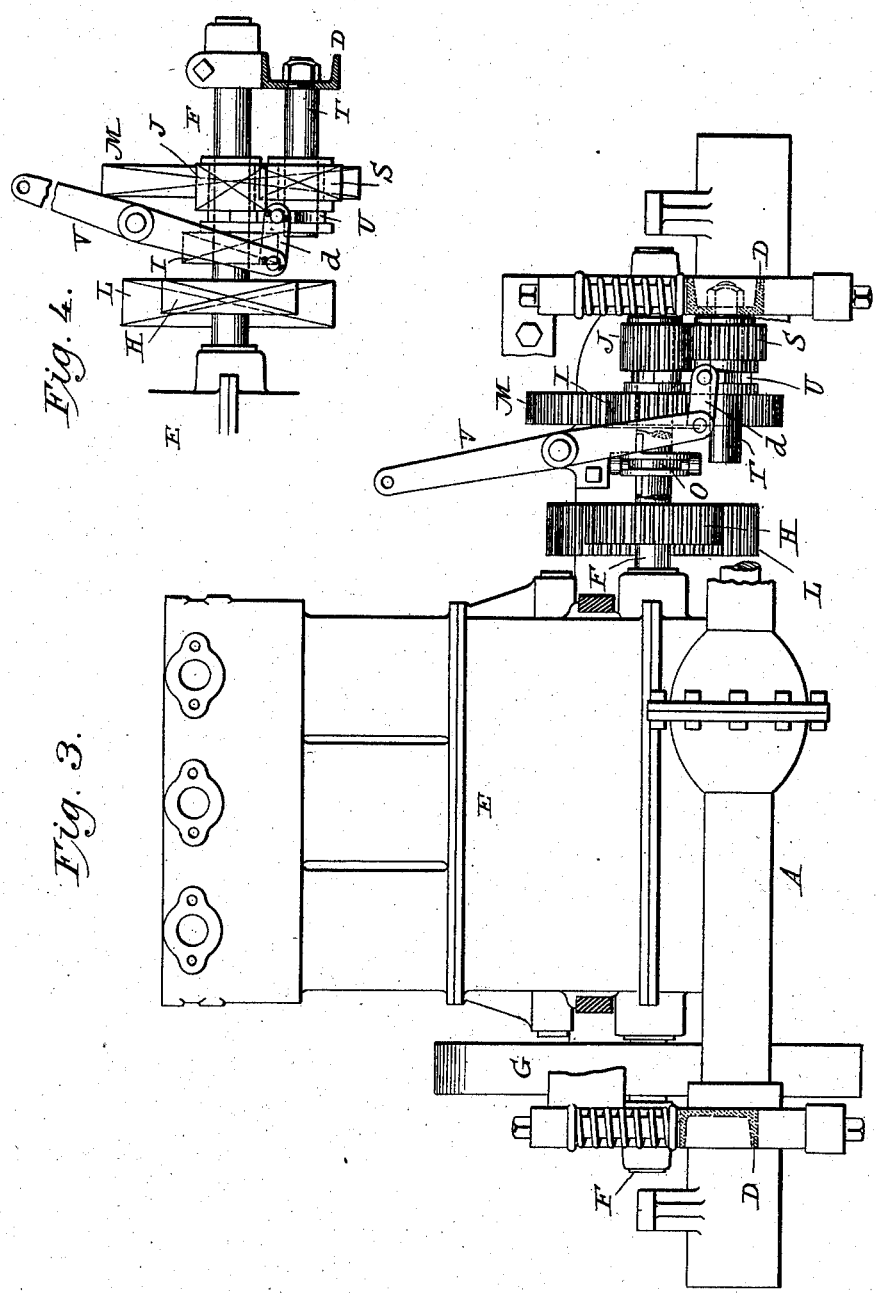

No. 669,924. Patented Mar. 12, 1901.
C. R. GREUTER.
DRIVING AND REVERSING GEAR.
(Application filed Feb. 15, 1900.)
(No Model.) 3 Sheets—Sheet 3.

Witnesses
Inventor:
Charles R. Greuter,
by Dodge and Sons
Attorneys.

UNITED STATES PATENT OFFICE.

CHARLES R. GREUTER, OF HOLYOKE, MASSACHUSETTS, ASSIGNOR TO THE HOLYOKE AUTOMOBILE COMPANY, OF JERSEY CITY, NEW JERSEY.

DRIVING AND REVERSING GEAR.

SPECIFICATION forming part of Letters Patent No. 669,924, dated March 12, 1901.

Application filed February 15, 1900. Serial No. 5,360. (No model.)

*To all whom it may concern:*

Be it known that I, CHARLES R. GREUTER, a citizen of the United States, residing at Holyoke, in the county of Hampden and State of Massachusetts, have invented certain new and useful Improvements in Driving and Reversing Gear, of which the following is a specification.

My invention has reference to reversing-gear for self-propelled vehicles, and is designed to vary or lessen the speed so that the backward travel shall be less rapid than the forward.

The invention is illustrated in the accompanying drawings, wherein—

Figure 5:
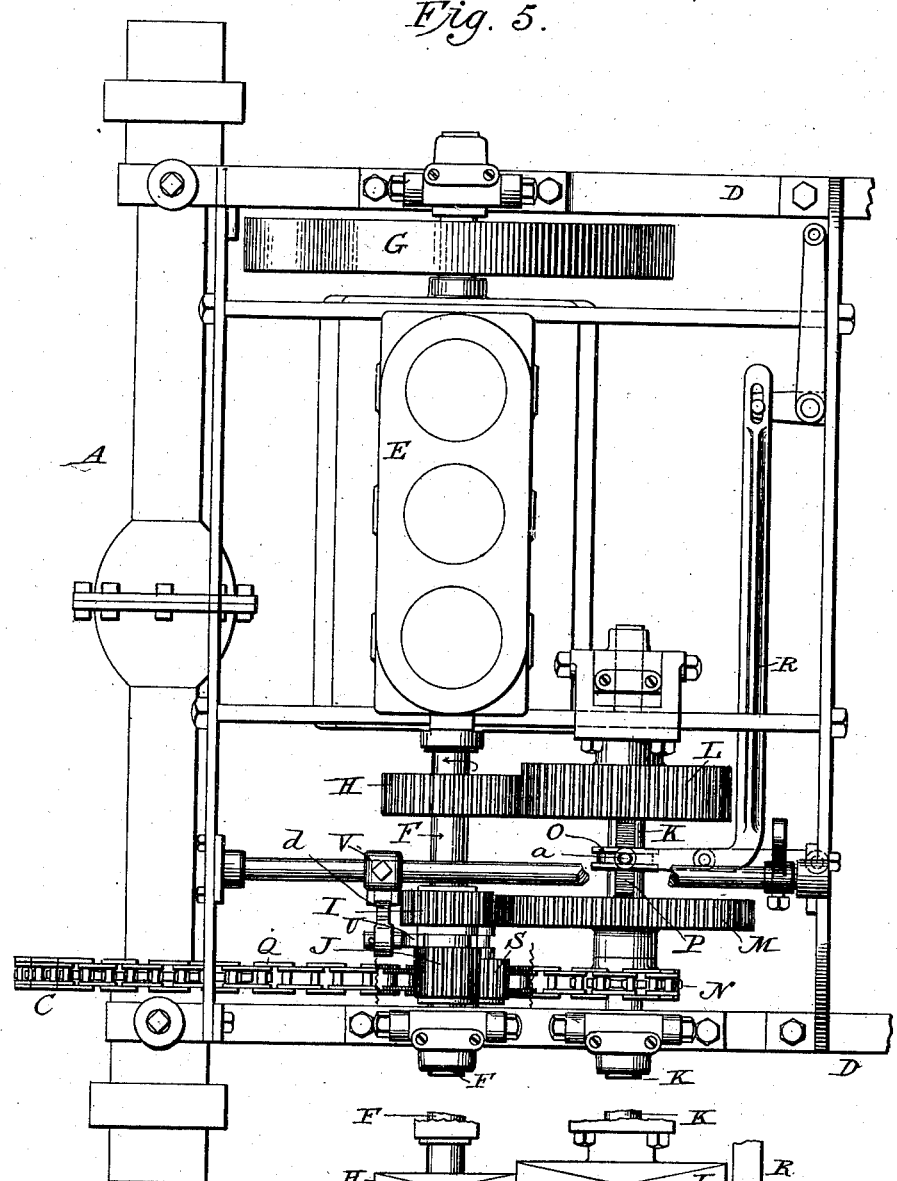
Figure 6:
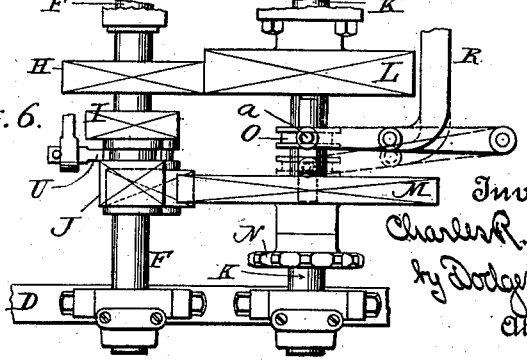

Figure 1 is a side elevation of the rear portion of the running-gear and propelling mechanism of a road-vehicle or automobile embodying my invention; Fig. 2, a diagrammatic view of the gearing or a portion thereof; Fig. 3, a rear view of the engine, gearing, and shifting lever; Fig. 4, a diagrammatic view showing the gearing of Fig. 3 shifted or reversed; Fig. 5, a top plan view of the engine, driving-gear, and reversing mechanism; Fig. 6, a diagrammatic view showing the same gearing in a different adjustment; Fig. 7, a face elevation of the yoke for shifting the movable-gear members.

The invention herein set forth is applicable to various structures wherein reversal of direction of movement or travel from time to time is desired, but being particularly intended for road-vehicles it has been deemed advisable to introduce as a feature of construction a slowing down of the speed simultaneous with reversal of the gearing to cause backward travel of the vehicle. This is done for the reason that the roadway is less readily seen behind the vehicle than in front of it, and that it is consequently dangerous to proceed at as great a speed in a backward direction as when moving forward.

The character of the engine or motor, the general construction of the vehicle, and other matters apart from the gearing itself, may vary as desired, the present invention relating solely to the reversing mechanism.

A indicates the rear axle of the vehicle, upon which is made fast a ground-wheel B and a chain or sprocket wheel C.

D indicates a frame the rear portion of which is carried upon or sustained by the axle B, while the forward end will be sustained by a second axle and wheels or in any usual manner. Upon this frame D is mounted an engine or motor E of any approved type, a gasolene or kerosene engine being here contemplated and preferably employed in practice. The engine has a main shaft F, carrying usually a heavy fly-wheel G and in the present instance a pinion H, keyed or otherwise made fast thereto, and a double or compound pinion I J, said latter pinion being formed upon or connected by a sleeve which encircles and is splined to slide upon the shaft F in reversing the motion of the vehicle. Parallel with and in the present case forward of the shaft F is a second shaft K, which is encircled by two loose gears L and M and also by a sprocket-wheel N, which is keyed or otherwise made fast upon said shaft K, so that it shall necessarily rotate therewith.

O indicates a circumferentially-grooved collar encircling the shaft K and carrying a key or feather P, which moves in a keyway or slot extending lengthwise of the shaft K. The key or feather P is of such length that when in its medial position its ends clear both of the wheels L and M, but when moved from said medial position in one or the other direction it engages one or the other of said wheels L M and locks the same to said shaft, thereby causing such gear to rotate with the shaft.

Gear-wheel L meshes with gear-wheel H of shaft F, and gear-wheel M, which is materially larger than gear L, meshes normally with sliding pinion I of shaft F. It will thus be seen that if the collar O be adjusted to its medial position the shaft F, though imparting motion through the pinions H and I to the gears L and M, will not propel the vehicle either forward or backward, because said gears L and M will rotate freely upon the shaft K without turning the same, and consequently without turning the sprocket-wheel N, from which motion is transmitted to the sprocket-wheel C of the rear axle through chain or other connection Q. If now the collar O be moved to carry the feather or key P into engagement with the gear-wheel L and to lock the same to the shaft K, it will be seen that the vehicle will be propelled in a forward direction, because the main shaft F of the engine rotates always backward under the arrangement indicated, and there will be one change of direction incident to the meshing of the wheels H and L. The speed under this arrangement will be relatively high, because the disparity in the diameters of the pinion H and gear-wheel L is not great. If, on the other hand, the collar O and feather or key P be shifted in the reverse direction, so as to connect the gear-wheel M with shaft K, the vehicle will still be propelled in a forward direction, but at a slower speed, because the gear L will then run loose upon the shaft, while the gear M, locked to the shaft, will be rotated by the pinion I of the main engine-shaft F, the difference in diameters of the pinion I and gear M being relatively great and the driving-pinion being much the smaller of the two.

The clutching and unclutching of the gears L and M are effected by an elbow-lever R, the short arm of which is forked and provided with studs or pins $a$ to enter the circumferential groove of the collar O. This is illustrated in Figs. 3, 5, &c., and is a matter of construction well understood in the art, hence need not be further referred to.

The lever R will be actuated either directly or through connection with a hand or foot lever, located in any convenient position to be reached by the motorman or occupant of the vehicle. By this means two different speeds are provided for the vehicle when going forward, and it is also made possible to stop the vehicle, while permitting the engine to continue in motion.

The reversing-gear is combined with the driving-gearing above explained and comprises in addition to the compound or double pinion I J a third sliding pinion S, loosely encircling a stud-axle T, carried by the frame D and arranged to remain always in mesh and to slide longitudinally with the pinion J. This will be best understood upon referring to Figs. 3 and 4, where the stud-axle T is seen in elevation. It is also shown in Figs. 1 and 2, where it is seen below and slightly in advance of the engine-shaft F.

The pinion S is arranged to remain always in mesh with pinion J, so that it shall receive motion from said pinion, and consequently from the shaft F, to which the pinion J is splined or feathered. The pinion S is of such diameter and its axle T is located in such relation to gear-wheel M that when pinion I is moved lengthwise of shaft F out of mesh or engagement with gear-wheel M said pinion S shall enter into mesh with the gear M and give motion thereto, and consequently to chain-wheel N, chain Q, sprocket-wheel G, and the axle or ground wheel, to which said sprocket G is made fast. Inasmuch, however, as gear-wheel S receives its motion from shaft F through the medium of pinion J it will be apparent that pinion S turns in the reverse direction from shaft F and that as a consequence the direction of rotation of gear-wheel M, and consequently of the driven groundwheel of the vehicle, is reversed when pinion S is in mesh with gear-wheel M from what it will be when gear-wheel M is directly driven by the pinion I. Thus it will be seen that by shifting the pinion I out of mesh with gear-wheel M and moving pinion S into mesh with said gear I simultaneously reverse the motion and reduce the speed of the vehicle.

For the purpose of simultaneously shifting the compound pinion I J and the pinion S, I provide a yoke U, shown in elevation or in face view in Fig. 7 and having two forks or crotches $b$ and $c$, one to fit a circumferential groove in the sleeve or collar connecting the pinions I J and the other to fit a similar collar projecting from the end or side face of the pinion S, as best seen in Figs. 2, 3, and 4. The yoke or shifter-plate U is connected by a link $d$ with the lever V, which may be directly manipulated by the motorman or occupant of the vehicle or may be connected through any suitable intermediate devices to a hand or foot lever conveniently located for actuation by the motorman or attendant.

The distance to which pinion S is moved away from or out of alinement with gear-wheel M is slightly greater than the meshing width of gears I M, so that pinion I shall be completely withdrawn from engagement with gear M before pinion S can begin to mesh therewith. This precaution is of course necessary to prevent locking of the parts or injury thereto.

Having thus described my invention, what I claim is—

1. In combination with the main driving-shaft F, a pinion H fixed thereon; compound pinion I, J, splined or feathered upon said shaft; axle T parallel with shaft F; pinion S loose upon said axle; shaft K parallel with shaft F and provided with loose gears L, M; clutch O, P, adapted to connect and to disconnect the gears L, M, with and from shaft K; connections, substantially such as described and shown, between the driven shaft K and a ground-wheel of the vehicle; and means for shifting the compound pinion I, J, and the pinion S, relatively to gear M.

2. In combination with shaft provided with compound pinion I, J; shaft K provided with gear-wheel M; pinion S meshing with the pinion J; and means for simultaneously moving pinion I into and moving pinion S out of mesh with gear M, or for reversing said movement and bringing pinion S into and carrying pinion I out of mesh with said gear M, substantially as set forth.

3. The herein-described gearing for motor-vehicles, comprising an engine-shaft F, fixed pinion H, and sliding compound pinion I, J, carried by said shaft; parallel shaft K; loose gears L and M carried by said shaft K; clutch-key P seated in said shaft K and adapted to be thrown into engagement with either wheel L or M, or disconnected from both; stationary axle T; pinion S mounted upon said axle and meshing with pinion J; means for moving the key P; and means for sliding the compound pinion I, J, and pinion S in the direction of their axes, substantially as and for the purpose set forth.

In witness whereof I hereunto set my hand in the presence of two witnesses.

CHARLES R. GREUTER.

Witnesses:
ANDREW H. MATHESON,
ARTHUR E. PHELON.